US010247269B2

(12) United States Patent
Iwai et al.

(10) Patent No.: US 10,247,269 B2
(45) Date of Patent: Apr. 2, 2019

(54) PISTON MANUFACTURING DEVICE, PISTON MANUFACTURING METHOD, PISTON AND DISC BRAKE

(71) Applicant: HITACHI AUTOMOTIVE SYSTEMS, LTD., Hitachinaka-shi, Ibaraki (JP)

(72) Inventors: Yoshinari Iwai, Kai (JP); Hiroshi Okita, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 91 days.

(21) Appl. No.: 15/325,798

(22) PCT Filed: Apr. 9, 2015

(86) PCT No.: PCT/JP2015/061071
§ 371 (c)(1),
(2) Date: Jan. 12, 2017

(87) PCT Pub. No.: WO2016/017213
PCT Pub. Date: Feb. 4, 2016

(65) Prior Publication Data
US 2017/0175836 A1    Jun. 22, 2017

(30) Foreign Application Priority Data

Jul. 31, 2014  (JP) .................................. 2014-156158

(51) Int. Cl.
*B21D 39/00* (2006.01)
*F16D 65/18* (2006.01)
(Continued)

(52) U.S. Cl.
CPC ............... *F16D 65/18* (2013.01); *B21H 1/00* (2013.01); *B21H 7/182* (2013.01); *B21K 1/18* (2013.01);
(Continued)

(58) Field of Classification Search
CPC ............. B21H 1/18; F16D 65/18; B21K 1/18

USPC .......... 29/888.044, 888.049, 888.06; 92/208; 188/72.4, 72.8, 156–164
See application file for complete search history.

(56) References Cited

U.S. PATENT DOCUMENTS 5,136,772 A * 8/1992 Rupprecht ............ B23P 11/005
29/509
6,637,317 B1 * 10/2003 Zeibig ..................... B23P 15/10
92/129
(Continued)

FOREIGN PATENT DOCUMENTS

JP         3013384       7/1995
JP      2001-105072      4/2001
(Continued)

OTHER PUBLICATIONS

International Search Report for PCT/JP2015/061071 dated Jun. 30, 2015, 2 pages.
(Continued)

*Primary Examiner* — Christopher P Schwartz
(74) *Attorney, Agent, or Firm* — Mattingly & Malur, PC

(57) ABSTRACT

A piston manufacturing device includes a first forming device (42) configured to form an annular groove (61) in a piston (11), and a second forming device (52) configured to press an edge (15) of an opening (14) of the piston (11) toward other end side in an axial direction of the piston (11) and to form a thick section (65) extruded from an inner circumferential surface (12b) arranged between the edge (15) and the groove (61) toward an axial center side of the piston (11), wherein a recessed section (53) is formed at a portion of the second forming device (52) that is arranged to abut the edge (15) so that an inner circumferential side of the edge (15) is plastically deformed toward the other end side in an axial direction of the piston (11).

6 Claims, 9 Drawing Sheets

(51) Int. Cl.
*B21H 1/00* (2006.01)
*B21K 1/18* (2006.01)
*F16D 65/00* (2006.01)
*B21H 7/18* (2006.01)
*F16D 125/04* (2012.01)
*F16D 125/06* (2012.01)

(52) U.S. Cl.
CPC ...... *F16D 65/0006* (2013.01); *F16D 2125/04* (2013.01); *F16D 2125/06* (2013.01); *F16D 2200/003* (2013.01); *F16D 2200/0021* (2013.01); *F16D 2200/0082* (2013.01); *F16D 2250/0023* (2013.01)

(56) References Cited

U.S. PATENT DOCUMENTS

| | | | | |
|---|---|---|---|---|
| 9,151,385 | B2* | 10/2015 | Winkler | F16J 1/12 |
| 2007/0199774 | A1* | 8/2007 | Iwata | B21J 5/12 |
| | | | | 188/72.8 |
| 2008/0314239 | A1* | 12/2008 | Leidecker | B23P 15/10 |
| | | | | 92/169.1 |

FOREIGN PATENT DOCUMENTS

| | | |
|---|---|---|
| JP | 2007-90372 | 4/2007 |
| JP | 4108752 | 6/2008 |
| JP | 2014-61534 | 4/2014 |

OTHER PUBLICATIONS

Written Opinion of the ISA for PCT/JP2015/061071 dated Jun. 30, 2015, 3 pages.

\* cited by examiner

PISTON MANUFACTURING DEVICE, PISTON MANUFACTURING METHOD, PISTON AND DISC BRAKE

TECHNICAL FIELD

The present invention relates to a piston manufacturing device, a piston manufacturing method, a piston and a disc brake.

This application is the U.S. national phase of International Application No. PCT/JP2015/061071 filed Apr. 9, 2015 which designated the U.S. and claims priority to JP Patent Application No. 2014-156158 filed Jul. 31, 2014, the entire contents of each of which are hereby incorporated by reference.

BACKGROUND ART

A manufacturing device for pressing an end surface of an opening side of a cylindrical material from a side in an axial direction of the material when the opening side of the cylindrical material is pressed from an outer circumferential side thereof to form a groove in the material (for example, see Patent Literature 1) is known.

CITATION LIST

Patent Literature

[Patent Literature 1]
Japanese Unexamined Patent Application, First Publication No. 2007-90372

SUMMARY OF INVENTION

Technical Problem

In the above-mentioned manufacturing device, a variation may occur in a shape of a surface of the material in contact with the pad of the end surface of the piston.

The present invention provides a piston manufacturing device, a piston manufacturing method, a piston and a disc brake that are capable of suppressing a variation in a shape of a surface of a material which contacts with a pad at an end surface of a piston.

Solution to Problem

According to a first aspect of the present invention, a piston manufacturing device includes a first forming device configured to press a portion of a piston from an outer circumferential side of the piston to form an annular groove, the portion of the piston being separated from an edge of an opening provided at one end side in an axial direction of the piston; and a second forming device configured to press the edge of the opening of the piston toward other end side in the axial direction of the piston and to form a thick section extruded from an inner circumferential surface of the piston toward an axial center side of the piston, the inner circumferential surface being formed between the edge and the groove, wherein a recessed section is formed at a portion of the second forming device that is arranged to abut the edge so that an inner circumferential side of the edge is plastically deformed toward the other end side in the axial direction of the piston.

According to a second aspect of the present invention, a piston manufacturing method includes a groove forming step of pressing a portion of a piston from an outer circumferential side of the piston and forming an annular groove, the portion of the piston being separated from an edge of an opening provided at one end side in an axial direction of the piston; and a thick section forming step of pressing the edge of the opening of the piston toward other end side in the axial direction of the piston and forming a thick section extruded from an inner circumferential surface of the piston toward an axial center side of the piston, the inner circumferential surface being formed between the edge and the groove, wherein the thick section forming step includes plastically deforming an inner circumferential side of the edge toward the other end side in the axial direction of the piston.

According to a third aspect of the present invention, in a piston, a portion in a central axis direction of an edge of an opening of one end side in the axial direction is a thick section protruding in the central axis direction, and the thick section is folded toward the bottom section. A cross section of the folded area is a curved line.

According to a fourth aspect of the present invention, a disc brake includes the piston; a cylinder in which the piston is movably disposed; and a brake pad arranged to be pressed by the edge of the opening of the piston and come in contact with a disc.

Advantageous Effects of Invention

According to the above-mentioned piston manufacturing device, it is possible to provide a piston manufacturing device, a piston manufacturing method, a piston and a disc brake that are capable of suppressing a variation in a shape of a surface of a material which contacts with a pad at an end surface of a piston.

DESCRIPTION OF EMBODIMENTS

First Embodiment

A first embodiment according to the present invention will be described below with reference to FIGS. 1 to 5.

Figure 1:
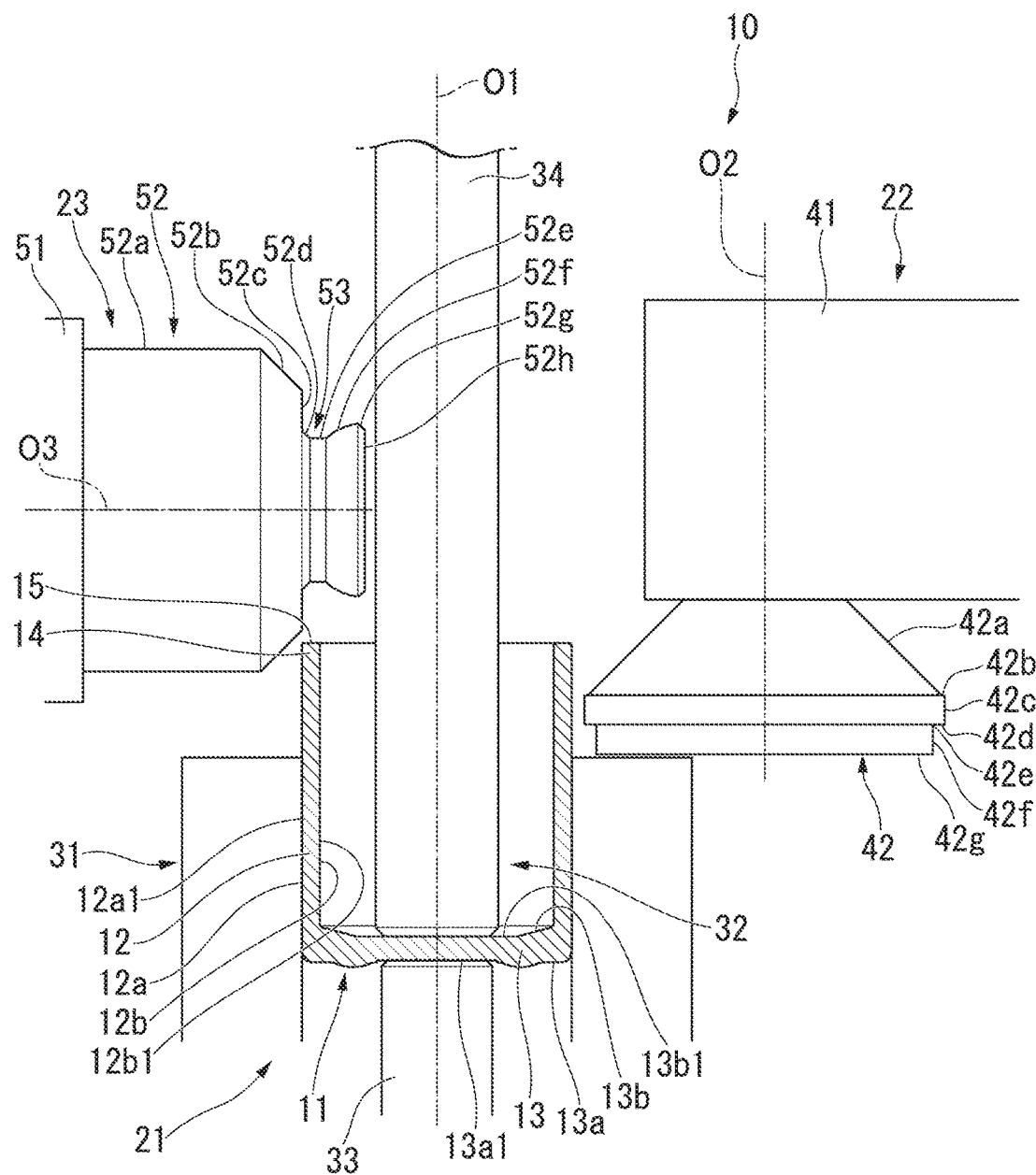
FIG. 1 is a front view showing a partial cross section of a piston manufacturing device and a piston of a first embodiment before machining thereof.

As shown in FIG. 1, a piston manufacturing device 10 of the first embodiment machines a piston 11 in a state of a material having a bottomed cylindrical shape.

Referring to FIG. 1, first, the piston 11 in a state of the material before machining by the piston manufacturing device 10 will be described. The piston 11 in a state of a material has a tubular section 12 having a cylindrical shape, and a bottom section 13 having a disc shape. Central axes of the tubular section 12 and the bottom section 13 coincide with each other, and this central axe is a central axis of the piston 11.

The bottom section 13 closes one end side of the tubular section 12 in an extension direction of a central axis of the piston 11 (hereinafter, referred to as a piston axial direction). In addition, a side of the tubular section 12 opposite to the bottom section 13 in the piston axial direction is an opening 14 that is open without being blocked. An edge 15 of an end portion of the opening 14 opposite to the bottom section 13 in the piston axial direction is a farthest end portion of the piston 11 opposite to the bottom section 13 in the piston axial direction. Accordingly, the piston 11 in the state of the material has a bottomed cylindrical shape.

In the tubular section 12, a range of an outer circumferential surface 12a except for both end portions in the piston axial direction is an outer circumferential cylindrical surface 12a1 formed by a cylindrical surface having a constant diameter about the central axis of the piston 11. In addition, in the tubular section 12, a range of an inner circumferential surface 12b except for both end portions in the piston axial direction is an inner circumferential cylindrical surface 12b1 constituted by a cylindrical surface having a constant diameter about the central axis of the piston 11. The piston 11 in the state of the material has the outer circumferential cylindrical surface 12a1 having a maximum diameter. In addition, the opening 14 of the piston 11 in the state of the material has the inner circumferential cylindrical surface 12b1 having a minimum diameter.

In an outer bottom surface 13a of the bottom section 13 provided opposite to the opening 14 in the piston axial direction, a central range in the radial direction of the piston 11 has an outer bottom flat surface 13a1 that is planar and perpendicular to the central axis of the piston 11. In addition, in an inner bottom surface 13b of the bottom section 13 formed at the opening 14 side in the piston axial direction, a central range in the radial direction of the piston 11 has an inner bottom flat surface 13b1 that is planar and perpendicular to the central axis of the piston 11.

The piston 11 in the state of the material is a forged article formed of, for example, a steel material or an aluminum alloy material, and after forging, is formed in the above-mentioned shape to adjust a length in the piston axial direction when allowing some error (variation) and cutting the opening 14 side.

The piston manufacturing device 10 is a rotating plastic working apparatus (a spinning apparatus) configured to plastically deform the piston 11 serving as a workpiece while rotating the piston 11, and has a rotating device 21, a groove forming device 22 and an edge forming device 23.

The rotating device 21 has a gripping part 31 and a clamping part 32. The gripping part 31 grips the outer circumferential cylindrical surface 12a1 of the tubular section 12 of the piston 11 in the state of the material from the outside in a radial direction of the piston 11 (hereinafter, referred to as a piston radial direction). The clamping part 32 sandwiches the bottom section 13 of the piston 11 in the state of the material from both sides in the piston axial direction. The rotating device 21 rotates the gripping part 31 and the clamping part 32 about a rotation central axis O1 using a driving force of a motor (not shown). The rotating device 21 is disposed in a posture in which the rotation central axis O1 extends vertically.

The gripping part 31 can be increased and reduced in diameter about the rotation central axis O1. The gripping part 31 grips the piston 11 by reducing the diameter and releases the gripping of the piston 11 by increasing the diameter. The gripping part 31 uniformly presses a plurality of places (for example, three places) in a circumferential direction on the outer circumferential cylindrical surface 12a1 of the piston 11 (hereinafter, referred to as a piston circumferential direction) in a direction of a central axis of the piston 11 (hereinafter, referred to as a piston central axis direction) when the piston 11 is gripped. Accordingly, the gripping part 31 causes the central axis of the piston 11 to coincide with the rotation central axis O1 upon gripping of the piston 11 to be integrally rotated with the piston 11. For example, a collet chuck may be used as the gripping part 31.

The clamping part 32 has an outer core bar 33 and an inner core bar 34. The outer core bar 33 abuts the outer bottom flat surface 13a1 of the bottom section 13 of the piston 11 outside the piston 11. The inner core bar 34 is disposed above the outer core bar 33, enters the piston 11 from the opening 14, and abuts the inner bottom flat surface 13b1 of the bottom section 13 of the piston 11. The outer core bar 33 and the inner core bar 34 coincide with the rotation central axis O1 at the central axes thereof. The outer core bar 33 of the lower side always causes positions in the extension direction of the gripping part 31 and the rotation central axis O1 to coincide with each other. The inner core bar 34 can approach and be separated from the outer core bar 33 in the extension direction of the rotation central axis O1.

The piston 11 is disposed at the rotating device 21 such that the outer bottom flat surface 13a1 abuts the outer core bar 33 in a state in which the gripping part 31 is increased in diameter and the inner core bar 34 is separated from the outer core bar 33. Then, from this state, the rotating device 21 causes the inner core bar 34 to approach the outer core bar 33 to abut the inner bottom flat surface 13b1 and reduces a diameter of the gripping part 31. Accordingly, the inner core bar 34 and the outer core bar 33 of the clamping part 32 sandwich the bottom section 13 and the gripping part 31 grips the tubular section 12. In this way, the rotating device 21 integrally rotatably supports the piston 11. When the piston 11 is supported by the rotating device 21 in this way, the piston 11 has a portion of the opening 14 side of the tubular section 12 protruding upward from the gripping part 31.

The rotating device 21 rotates the gripping part 31 and the clamping part 32 about the rotation central axis O1 using a driving force of a motor (not shown) in a state in which the piston 11 is supported. Thus, the piston 11 is also rotated in a state in which a position in an extension direction of the rotation central axis O1 is constant about the rotation central axis O1. As a result, the piston 11 is rotated in the piston circumferential direction while the position in the piston axial direction is constant about the central axis. That is, the rotating device 21 rotates the piston 11 in the piston circumferential direction.

The groove forming device 22 has a head 41 and a groove forming roller 42 (a first forming device). The head 41 is linearly and horizontally moved to approach or be separated from the rotation central axis O1 of the rotating device 21, i.e., moved in the radial direction of the piston 11 using a driving force of the motor (not shown). The groove forming roller 42 is disposed under the head 41, and supported by the head 41 to be rotated about a rotation central axis O2 parallel to the rotation central axis O1. The groove forming roller 42 approaches and is separated from the rotation central axis O1 in a state in which a position in the extension direction of the rotation central axis O2 is constant.

The groove forming roller 42 has a tapered outer circumferential surface 42a, a stepped surface 42b, a cylindrical outer circumferential surface 42c, a stepped surface 42d, a tapered outer circumferential surface 42e, a cylindrical outer circumferential surface 42f and an end surface 42g in sequence from the head 41 side in the extension direction of the rotation central axis O2.

The tapered outer circumferential surface 42a is a tapered surface formed about the rotation central axis O2 and having a diameter that increases downward.

The stepped surface 42b extends from the lower edge portion of the tapered outer circumferential surface 42a outward in the radial direction. The stepped surface 42b has an annular shape about the rotation central axis O2 and a flat surface disposed at the same plane as the surface perpendicular to the rotation central axis O2.

The cylindrical outer circumferential surface 42c is a cylindrical surface extending downward from the outer circumferential edge portion of the stepped surface 42b and formed about the rotation central axis O2.

The stepped surface 42d extends from the lower edge portion of the cylindrical outer circumferential surface 42c inward in the radial direction. The stepped surface 42d is a flat surface having an annular shape about the rotation central axis O2 and disposed at the same plane as the surface perpendicular to the rotation central axis O2. The stepped surface 42d has a difference between inner and outer diameters larger than that of the stepped surface 42b, and a width in the radial direction that increases.

The tapered outer circumferential surface 42e is a tapered surface extending downward from the inner circumferential edge portion of the stepped surface 42d and formed about the rotation central axis O2. The tapered outer circumferential surface 42e has a diameter that decreases downward.

The cylindrical outer circumferential surface 42f is a cylindrical surface extending downward from the lower edge portion of the tapered outer circumferential surface 42e and formed about the rotation central axis O2. The cylindrical outer circumferential surface 42f has a diameter smaller than that of the cylindrical outer circumferential surface 42c.

The end surface 42g extends from the lower edge portion of the cylindrical outer circumferential surface 42f inward in the radial direction. The end surface 42g is a flat surface having a circular shape about the rotation central axis O2 and disposed at the same plane as the surface perpendicular to the rotation central axis O2.

The groove forming roller 42 is disposed above the gripping part 31 of the rotating device 21, and overlaps with the tubular section 12 protruding upward from the gripping part 31 of the piston 11 supported by the rotating device 21 at positions in the extension direction of the rotation central axes O1 and O2. More specifically, in the groove forming roller 42, a portion of the stepped surface 42b side of the tapered outer circumferential surface 42a, the stepped surface 42b, the cylindrical outer circumferential surface 42c, the stepped surface 42d, the tapered outer circumferential surface 42e, the cylindrical outer circumferential surface 42f and the end surface 42g overlap the tubular section 12 at positions in the extension direction of the rotation central axes O1 and O2.

The edge forming device 23 has a head 51 and an edge forming roller 52 (a second forming device). The head 51 linearly moves, i.e., vertically rises in a direction along the rotation central axis O1 of the rotating device 21 using a driving force of the motor (not shown), i.e., moves in the axial direction of the piston 11. The edge forming roller 52 is disposed at the rotation central axis O1 side of the head 51 and supported by the head 51 to be rotated about a rotation central axis O3 perpendicular to the rotation central axis O1. The edge forming roller 52 is made to approach and is separated from the rotating device 21 by raising the edge forming roller 52 in a state in which a position in the extension direction of the rotation central axis O3 is constant.

The edge forming roller 52 has a cylindrical outer circumferential surface 52a, a tapered outer circumferential surface 52b, a stepped surface 52c, a tapered outer circumferential surface 52d, a cylindrical outer circumferential surface 52e, a spherical outer circumferential surface 52f, a tapered outer circumferential surface 52g and an end surface 52h in sequence from the head 51 side in the extension direction of the rotation central axis O3.

The cylindrical outer circumferential surface 52a is a cylindrical surface formed about the rotation central axis O3.

The tapered outer circumferential surface 52b is a tapered surface extending from an edge portion of the rotation central axis O1 side of the cylindrical outer circumferential surface 52a toward the rotation central axis O1 and formed about the rotation central axis O3. The tapered outer circumferential surface 52b has a diameter that decreases toward the rotation central axis O1.

The stepped surface 52c extends from the edge portion of the rotation central axis O1 side of the tapered outer circumferential surface 52b inward in the radial direction. The stepped surface 52c is a flat surface forming an annular shape about the rotation central axis O3 and disposed at the same plane as the surface perpendicular to the rotation central axis O3.

The tapered outer circumferential surface 52d is a tapered surface extending from the inner circumferential edge portion of the stepped surface 52c toward the rotation central axis O1 and formed about the rotation central axis O3. The tapered outer circumferential surface 52d has a diameter that decreases toward the rotation central axis O1.

The cylindrical outer circumferential surface 52e is a cylindrical surface extending from the edge portion of the rotation central axis O1 side of the tapered outer circumferential surface 52d toward the rotation central axis O1 and formed about the rotation central axis O3. The cylindrical outer circumferential surface 52e has a diameter smaller than that of the stepped surface 52c.

The spherical outer circumferential surface 52f extends from the edge portion of the rotation central axis O1 side of the cylindrical outer circumferential surface 52e toward the rotation central axis O1, and is a portion of a surface of a sphere having a center at the rotation central axis O3 or a spheroid having a rotational center at the rotation central axis O3. The spherical outer circumferential surface 52f has a diameter about the rotation central axis O3 that increases toward the rotation central axis O1. The spherical outer circumferential surface 52f constituted by the portion of the surface of the sphere or the spheroid is a curved surface having a curved cross section when cut in the rotation axial direction, in other words, having a predetermined curvature.

The tapered outer circumferential surface 52g is a tapered surface extending from the edge portion of the rotation central axis O1 side of the spherical outer circumferential surface 52*f* toward the rotation central axis O1 and formed about the rotation central axis O3. The tapered outer circumferential surface 52*g* has a diameter that decreases toward the rotation central axis O1.

The end surface 52*h* extends from the edge portion of the rotation central axis O1 side of the tapered outer circumferential surface 52*g* inward in the radial direction. The end surface 52*h* is a flat surface having a circular shape about the rotation central axis O3 and perpendicular to the rotation central axis O3.

As the stepped surface 52*c*, the tapered outer circumferential surface 52*d*, the cylindrical outer circumferential surface 52*e* and the spherical outer circumferential surface 52*f* are formed, a recessed section 53 recessed inward in the radial direction is formed at the edge forming roller 52. The recessed section 53 also has an annular shape about the rotation central axis O3. The recessed section 53 is curved such that the spherical outer circumferential surface 52*f* constituting a portion thereof has a predetermined curvature.

The edge forming roller 52 is disposed above the gripping part 31 of the rotating device 21, and the tubular section 12 including the opening 14 of the piston 11 and the edge forming roller 52 overlap each other at a position in the extension direction of the rotation central axis O3 in the state of the material supported by the rotating device 21. More specifically, the tapered outer circumferential surface 52*d* and the cylindrical outer circumferential surface 52*e* of the edge forming roller 52 overlap the tubular section 12 including the opening 14 of the piston 11 in the state of the material at a position in the extension direction of the rotation central axis O3.

The piston manufacturing device 10 rotates the gripping part 31 and the clamping part 32 of the rotating device 21 about the rotation central axis O1 when the piston 11 in the state of the material is machined in a state in which the piston 11 is attached to the rotating device 21 as described above. Then, the piston 11 is rotated about the rotation central axis O1, i.e., the central axis of the piston 11 in the piston circumferential direction. This is a rotation step of a piston manufacturing method of rotating the piston 11 in the state of the cylindrical material in the piston circumferential direction.

The head 51 of the edge forming device 23 approaches the piston 11 driven and rotated by the rotating device 21 in this way by a driving force of the motor (not shown) while the head 41 of the groove forming device 22 approaches the piston 11 using the driving force of the motor (not shown).

When the head 41 approaches the piston 11, the groove forming roller 42 mainly brings the cylindrical outer circumferential surface 42*c* in contact with a portion of the piston 11 separated from the edge 15 of the opening 14 of one end side in the axial direction, and presses the portion from the outer circumferential cylindrical surface 12*a*1 side of the piston 11. Then, the groove forming roller 42 forms an annular groove 61 shown in FIG. 2 by plastically deforming the tubular section 12 at the outer circumferential side of the piston 11 using a portion of the stepped surface 42*b* side of the tapered outer circumferential surface 42*a*, the stepped surface 42*b*, the cylindrical outer circumferential surface 42*c*, the stepped surface 42*d* and the tapered outer circumferential surface 42*e* while being rotated around the rotating piston 11. This is a groove forming step of the piston manufacturing method of pressing the portion of the piston 11 separated from the edge 15 of the opening 14 at one end side in the axial direction from the outer circumferential surface 12*a* side of the piston 11 to form the annular groove 61.

Here, according to formation of the groove 61, an annular swelling section 62 that swells to have a diameter smaller than that of the inner circumferential cylindrical surface 12*b*1 is formed at a back surface of the groove 61 in the tubular section 12. The groove 61 has an annular shape formed about the rotation central axis O1, i.e., the central axis of the piston 11. The swelling section 62 also has an annular shape formed about the rotation central axis O1, i.e., the central axis of the piston 11. Further, the head 41 sends the groove forming roller 42 toward the rotation central axis O1, i.e., the central axis of the piston 11 until the cylindrical outer circumferential surface 42*f* of the groove forming roller 42 comes in contact with the outer circumferential cylindrical surface 12*a*1 of the piston 11.

Figure 2:
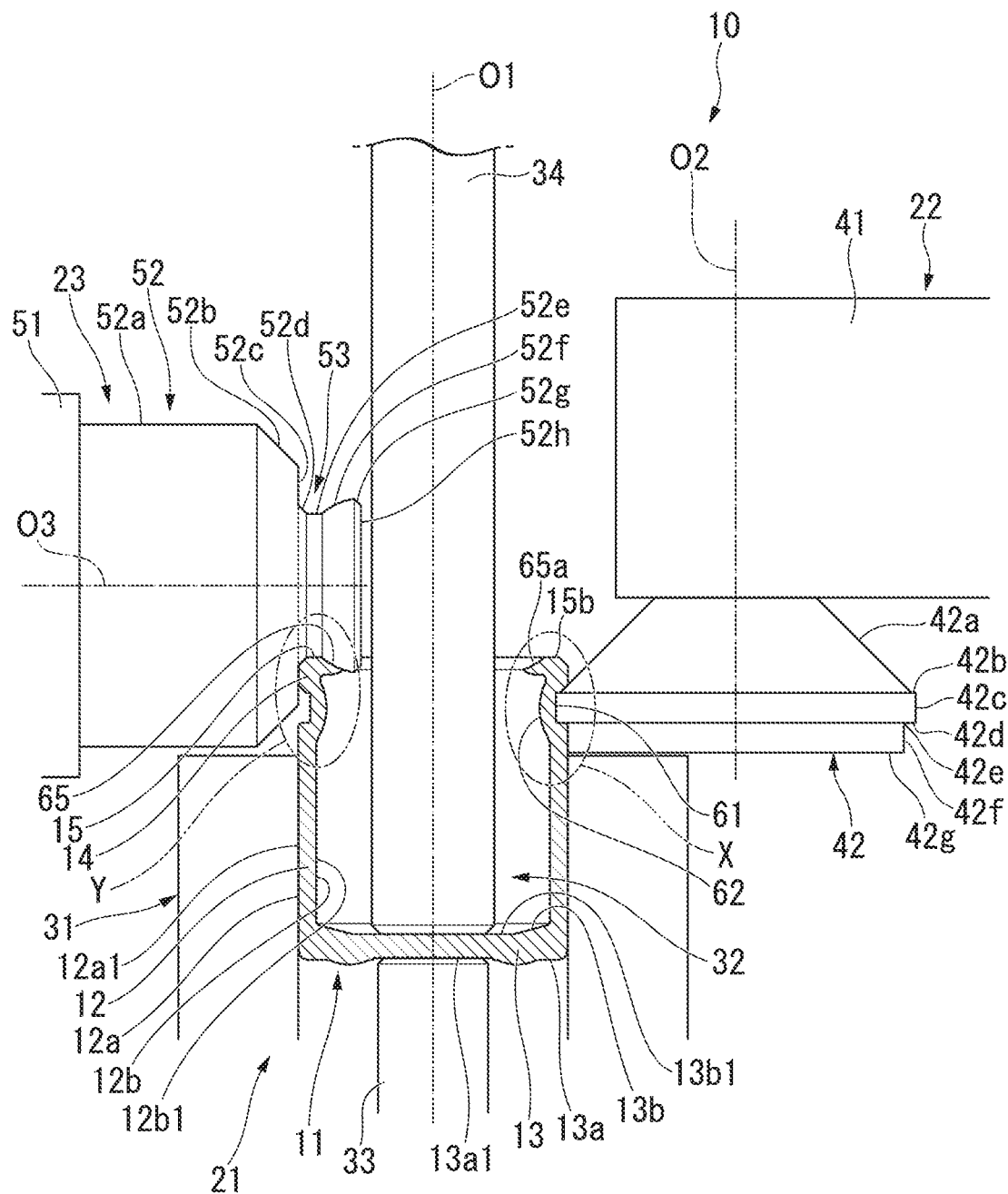
FIG. 2 is a front view showing a partial cross section of the piston manufacturing device and the piston of the first embodiment after machining thereof.

The head 51 of the edge forming device 23 approaches the piston 11 while the head 41 of the groove forming device 22 approaches the piston 11 as described above. As shown in FIG. 1, the edge forming roller 52 separated from the piston 11 causes the tapered outer circumferential surface 52*d* and the cylindrical outer circumferential surface 52*e* that form the recessed section 53 to abut the edge 15 of the opening 14 at one end side in the axial direction of the piston 11. Then, the edge 15 is pressed against the other end side in the axial direction opposite to the edge 15 of the piston 11 by mainly the tapered outer circumferential surface 52*d* and the cylindrical outer circumferential surface 52*e*. Then, the edge forming roller 52 plastically deforms the opening 14 of the piston 11 such that the position of the edge 15 approaches the bottom section 13 in the piston axial direction as shown in FIG. 2.

Here, the opening 14 of the piston 11 is restricted from being deformed toward an opposite side of the rotation central axis O1 by the stepped surface 52*c* formed at an opposite side of the rotation central axis O1 of the recessed section 53. Accordingly, a portion of an inner circumferential side of the edge 15 mainly extends inward in the radial direction, and at this time, the opening 14 is plastically deformed along the spherical outer circumferential surface 52*f* toward the other end side in the axial direction (the bottom section 13 side in the piston axial direction). As a result, a portion of mainly the inner circumferential side of the edge 15 becomes a thick section 65 extruded from the inner circumferential surface 12*b* between the edge 15 and the groove 61 toward the rotation central axis O1, which serves as an axial center of the piston 11, further than the inner circumferential cylindrical surface 12*b*1, and protrudes toward the rotation central axis O1. This is a thick section forming step of the piston manufacturing method of pressing the edge 15 of the opening 14 of the piston 11 against the other end side in the axial direction of the piston 11 using the recessed section 53, and forming the thick section 65 extruded toward the axial center side of the piston 11 from the inner circumferential surface 12*b* between the edge 15 and the groove 61. The thick section forming step includes plastically deforming the inner circumferential side of the edge 15 toward the other end side in the axial direction of the piston 11.

The recessed section 53 is formed at the portion of the edge forming roller 52 abutting the edge 15 of the piston 11 such that the inner circumferential side of the edge 15 is plastically deformed toward the other end side in the axial direction of the piston 11.

Here, in the piston manufacturing device 10, when the piston 11 is machined, the inner core bar 34 does not come in contact with the opening 14 including the edge 15 of the piston 11, and the inner core bar 34 does not press the edge 15 of the piston 11 from the inside. That is, the piston manufacturing device 10 does not include a means configured to press the edge 15 of the piston 11 from the inside, except for the recessed section 53. In other words, the piston manufacturing device 10 does not include a means configured to form a minimum diameter portion while coming in contact with the thick section 65.

Figure 3:
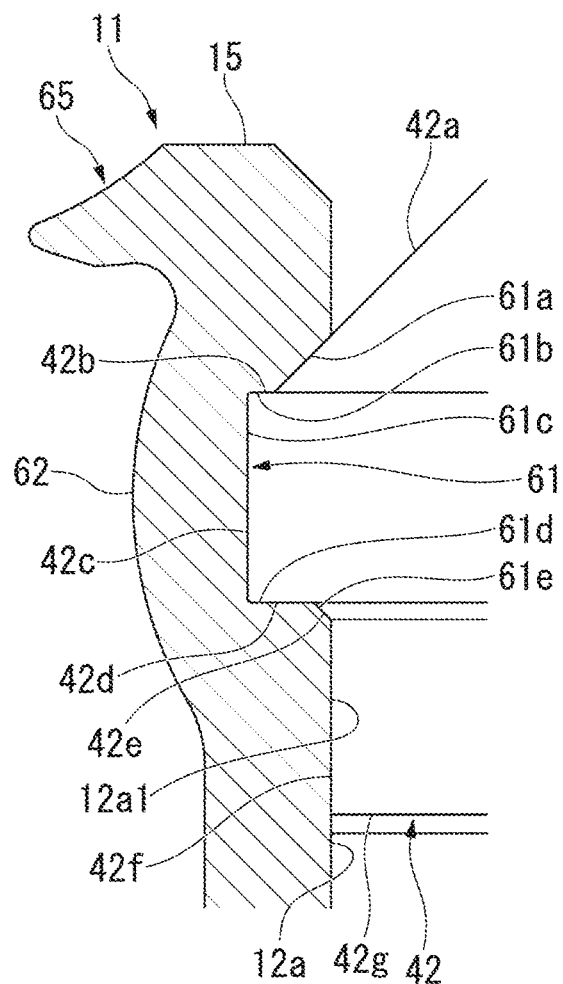
FIG. 3 is a partially enlarged view of a portion X of FIG. 2.

As shown in FIG. 3, the groove 61 of the piston 11 formed by the piston manufacturing device 10 has a tapered surface 61a, a groove wall surface 61b, a groove bottom surface 61c, a groove wall surface 61d and a tapered surface 61e in sequence from a side close to the edge 15.

The tapered surface 61a is a portion formed by the tapered outer circumferential surface 42a of the groove forming roller 42 and has a shape to which the tapered outer circumferential surface 42a is transferred. That is, the tapered surface 61a is a tapered surface formed about the rotation central axis O1 shown in FIG. 2, i.e., the central axis of the piston 11. As shown in FIG. 3, the tapered surface 61a extends from the outer circumferential cylindrical surface 12a1 of the piston 11, and has a diameter that decreases toward an opposite side of the edge 15 in the piston axial direction.

The groove wall surface 61b is a portion formed by the stepped surface 42b of the groove forming roller 42, and has a shape to which the stepped surface 42b is transferred. That is, the groove wall surface 61b extends from the inner circumferential edge portion opposite to the edge 15 in the piston axial direction of the tapered surface 61a inward in the piston radial direction. The groove wall surface 61b is a flat surface having an annular shape formed about the rotation central axis O1 shown in FIG. 2, i.e., the central axis of the piston 11, and disposed at the same plane as the surface perpendicular to the rotation central axis O1.

As shown in FIG. 3, the groove bottom surface 61c is a portion formed by the cylindrical outer circumferential surface 42c of the groove forming roller 42, and has a shape to which the cylindrical outer circumferential surface 42c is transferred. That is, the groove bottom surface 61c extends from the inner circumferential edge portion of the groove wall surface 61b in a direction opposite to the edge 15 in the piston axial direction. The groove bottom surface 61c is a cylindrical surface formed about the rotation central axis O1 shown in FIG. 2, i.e., the central axis of the piston 11.

As shown in FIG. 3, the groove wall surface 61d is a portion formed by the stepped surface 42d of the groove forming roller 42 and has a shape to which the stepped surface 42d is transferred. That is, the groove wall surface 61d extends from the edge portion of the groove bottom surface 61c opposite to the edge 15 in the piston axial direction outward in the piston radial direction. The groove wall surface 61d is a flat surface having an annular shape formed about the rotation central axis O1 shown in FIG. 2, i.e., the central axis of the piston 11 and disposed at the same plane as the surface perpendicular to the rotation central axis O1.

As shown in FIG. 3, the tapered surface 61e is a portion formed by the tapered outer circumferential surface 42e of the groove forming roller 42 and has a shape to which the tapered outer circumferential surface 42e is transferred. That is, the tapered surface 61e is a tapered surface formed about the rotation central axis O1 shown in FIG. 2, i.e., the central axis of the piston 11. As shown in FIG. 3, the tapered surface 61e extends from the outer circumferential edge portion of the groove wall surface 61d to the outer circumferential cylindrical surface 12a1 of the piston 11 and has a diameter that increases toward an opposite side of the edge 15 in the piston axial direction.

Figure 4:
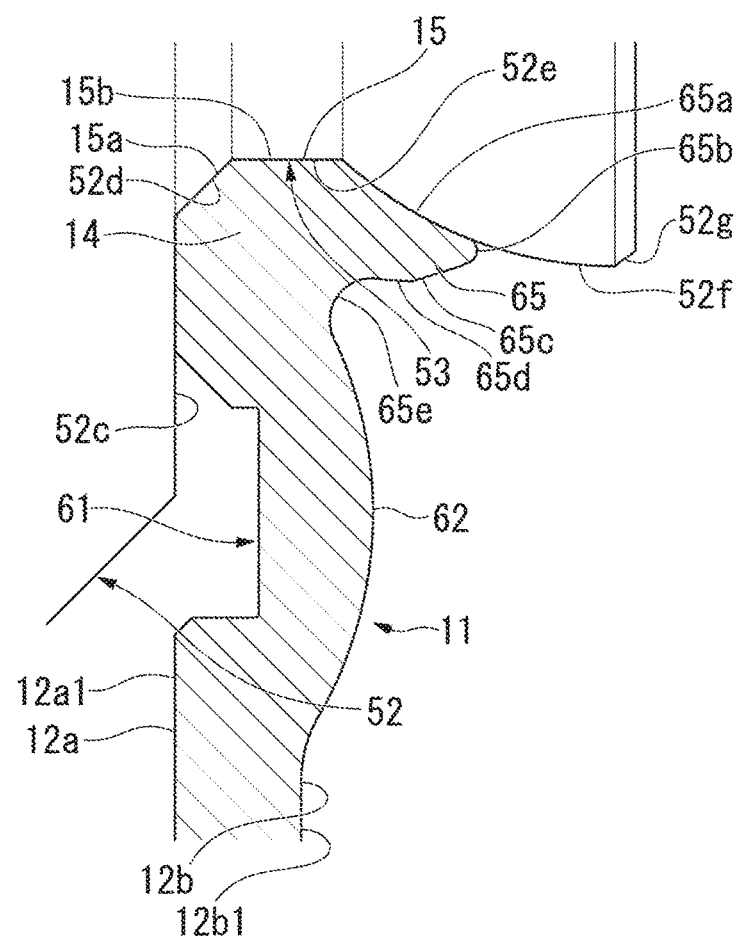
FIG. 4 is a partially enlarged view of a portion Y of FIG. 2.
Figure 5:
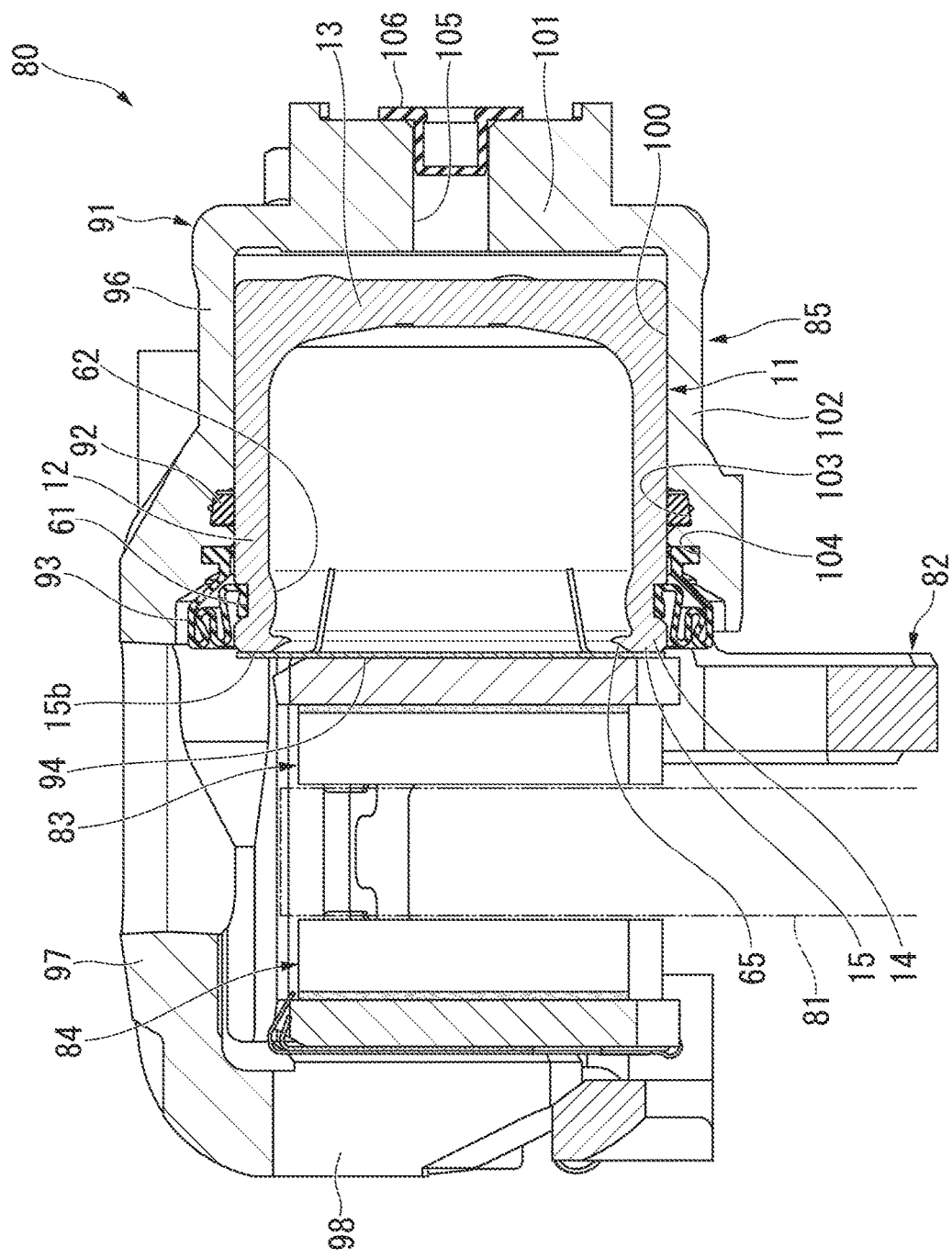
FIG. 5 is a cross-sectional view of a disc brake into which the piston manufactured by the piston manufacturing device of the first embodiment is incorporated.

As shown in FIG. 4, the edge 15 of the opening 14 of the piston 11 after machining by the piston manufacturing device 10 has a tapered surface 15a and an end surface 15b in sequence from a side close to the outer circumferential cylindrical surface 12a1.

The tapered surface 15a is a portion formed by the tapered outer circumferential surface 52d of the recessed section 53 of the edge forming roller 52 and has a shape to which the tapered outer circumferential surface 52d is transferred. That is, the tapered surface 15a is a tapered surface formed about the rotation central axis O1 shown in FIG. 2, i.e., the central axis of the piston 11. As shown in FIG. 4, the tapered surface 15a extends from the edge portion of the edge 15 side in the piston axial direction of the outer circumferential cylindrical surface 12a1 and has a diameter that decreases toward an extension end side.

The end surface 15b is a portion formed by the cylindrical outer circumferential surface 52e of the recessed section 53 of the edge forming roller 52 and has a shape to which the cylindrical outer circumferential surface 52e is transferred. That is, the end surface 15b is a flat surface having an annular shape formed about the rotation central axis O1 shown in FIG. 2, i.e., the central axis of the piston 11 and disposed at the same plane as the surface perpendicular to the rotation central axis O1. In the piston 11, the end surface 15b is disposed at the most opposite side of the bottom section 13 shown in FIG. 2 in the piston axial direction.

As shown in FIG. 4, the thick section 65 after formation by the piston manufacturing device 10 has a curved surface 65a, a curved surface 65b, a tapered surface 65c, a radial surface 65d and a curved surface 65e in sequence from the end surface 15b side. The curved surface 65a is also a portion of the edge 15 of the opening 14.

The curved surface 65a is a portion formed by the spherical outer circumferential surface 52f of the recessed section 53 of the edge forming roller 52. The curved surface 65a has an annular shape formed about the rotation central axis O1 shown in FIG. 2. i.e., the central axis of the piston 11. As shown in FIG. 4, the curved surface 65a has a shape to which the spherical outer circumferential surface 52f of the recessed section 53 of the edge forming roller 52 is transferred. That is, the curved surface 65a extends from the inner circumferential edge portion of the rotation central axis O1 side shown in FIG. 2 of the end surface 15b in the piston central axis direction, and is inclined to be disposed closer to the bottom section 13 as it goes toward a piston axial center side. Accordingly, the thick section 65 has a shape folded toward the bottom section 13. A cross section of the folded area is a curved shape and has a curved surface having a predetermined curvature. The curved surface 65a has a cross section having an arc shape in a plane including the rotation central axis O1, i.e., the central axis of the piston 11. The arc has a center disposed closer to the central axis of the piston 11 than a central position between both end portions thereof and opposite to the bottom section 13 in the piston axial direction. In other words, the arc has a shape recessed toward the inside of the piston 11.

The curved surface 65b shown in FIG. 4 extends from the inner circumferential edge portion of the curved surface 65a, and has an arc shape having a cross section at a plane including the rotation central axis O1 shown in FIG. 2, i.e., the central axis of the piston 11. The arc has a center at an opposite side of the central axis of the piston 11. The curved surface 65b has an annular shape formed about the rotation central axis O1 shown in FIG. 2, i.e., the central axis of the piston 11.

The tapered surface 65c shown in FIG. 4 is a tapered surface extending from the edge portion of the curved surface 65b opposite to the curved surface 65a and formed about the rotation central axis O1 shown in FIG. 2, i.e., the central axis of the piston 11. The tapered surface 65c shown in FIG. 4 is a tapered surface having a diameter that increases away from the end surface 15b in the piston axial direction.

The radial surface 65d extends from the outer circumferential edge portion of the tapered surface 65c outward in the piston radial direction. The radial surface 65d has an annular shape formed about the rotation central axis O1 shown in FIG. 2, i.e., the central axis of the piston 11.

The curved surface 65e extends from the outer circumferential edge portion of the radial surface 65d outward in the piston radial direction to be connected to the inner circumferential surface 12b. The curved surface 65e has an annular shape formed about the rotation central axis O1, i.e., the central axis of the piston 11. The curved surface 65e is inclined to be disposed at an opposite side of the end surface 15b in the piston axial direction as it goes outward in the piston radial direction. The curved surface 65e has an arc shape having a cross-sectional shape at a plane including the rotation central axis O1 shown in FIG. 2, i.e., the central axis of the piston 11. The arc has a concave shape recessed toward the inside of the piston 11.

As shown in FIG. 4, the thick section 65 has a minimum diameter smaller than the minimum diameter of the swelling section 62, and the minimum diameter of the curved surface 65a is also smaller than that of the swelling section 62. The maximum diameter of the curved surface 65a, i.e., the minimum diameter of the end surface 15b is larger than the minimum diameter of the swelling section 62, and smaller than the inner circumferential cylindrical surface 12b1 of the tubular section 12.

The edge 15 including the tapered surface 15a and the end surface 15b, and the thick section 65 including the curved surface 65a, the curved surface 65b, the tapered surface 65c, the radial surface 65d and the curved surface 65e are portions of the piston 11 formed by plastic deformation from the state of the material, and portions present in the piston 11 also in a final product state (a state in which the portions are incorporated in a brake apparatus, which will be described below). That is, cutting of the groove 61 and the edge 15 of the opening 14 is not performed until the piston 11 reaches the final product state from the material. Further, the piston 11 is a cuttingless piston in which cutting of the piston including the cutting of the groove 61 and the edge 15 are not performed to the entire piston 11 until the piston 11 reaches the final product state from the material.

The piston 11 formed by the above-mentioned piston manufacturing device 10 is formed in a bottomed cylindrical shape and includes the bottom section 13 and the tubular section 12, and the tubular section 12 includes the edge 15 of the opening 14 at one end side in the axial direction. Thus, the piston 11 has the thick section 65 in which an area of the edge 15 in the central axis direction of the piston 11 protrudes in the central axis direction. The thick section 65 is folded toward the bottom section 13, and a cross section of the folded area has a curved surface shape, which is curved, having a predetermined curvature.

The piston 11 formed by the piston manufacturing device 10 is disposed in a cylinder of a brake apparatus. Specifically, the piston 11 is incorporated in a disc brake 80 shown in FIG. 5. The disc brake 80 may be for a vehicle such as an automobile, specifically, a four-wheeled automobile. The disc brake 80 brakes the vehicle by stopping rotation of a disc 81 rotated with a wheel (not shown).

The disc brake 80 includes a support member 82, a pair of brake pads 83 and 84, and a pressing mechanism 85. The support member 82 is disposed over the outer circumferential side of the disc 81 to be fixed to a non-rotation section of the vehicle. The pair of brake pads 83 and 84 are supported by the support member 82 to be disposed to oppose both surfaces of the disc 81. The pressing mechanism 85 causes the pair of brake pads 83 and 84 to sandwich the disc 81 to press both surfaces of the disc 81.

The pressing mechanism 85 has a caliper body 91, the above-mentioned piston 11, a piston seal 92, a piston boot 93 and a pressing plate 94. The piston 11 is slidably installed at an inner side of the caliper body 91 (inside in the vehicle width direction). The piston seal 92 seals a gap between the caliper body 91 and the piston 11. The piston boot 93 is connected to the caliper body 91 and the piston 11 to cover a portion of the piston 11 exposed from the caliper body 91.

The caliper body 91 has a cylinder 96, a bridge section 97 and a claw section 98. The bridge section 97 extends from the cylinder 96 to cross over an outer circumference of the disc 81. The claw section 98 extends from a side of the bridge section 97 opposite to the cylinder 96 to oppose the cylinder 96. A bore 100 opening at the claw section 98 side is formed in the cylinder 96, and the piston 11 is movably disposed in the bore 100.

As the bore 100 is formed, the cylinder 96 has a bottom section 101 opposite to the claw section 98, and a tubular section 102 extending from an outer circumferential edge portion of the bottom section 101 toward the claw section 98 to form a cylindrical shape. An annular piston seal groove 103 is formed at an inner circumferential surface of the bore 100, and an annular boot support groove 104 is formed closer to the claw section 98 than the piston seal groove 103. The piston seal 92 is fitted into the piston seal groove 103. A through-hole 105 is formed in the bottom section 101 of the cylinder 96. The through-hole 105 is closed by a cap 106 attached upon assembly to the vehicle.

Then, the piston 11 is fitted into the bore 100 and the piston seal 92 in a posture in which the bottom section 13 is disposed at the bottom section 101 side in the bore 100. The piston seal 92 seals a gap between the cylinder 96 and the piston 11. One end side of the piston boot 93 is fitted into the boot support groove 104 of the cylinder 96 to be connected to the cylinder 96, and the other end side is fitted into the groove 61 of the piston 11 to be connected to the piston 11.

The pressing plate 94 is attached to the piston 11. The pressing plate 94 covers a side of the tubular section 12 of the piston 11 opposite to the bottom section 13. The piston 11 abuts the pressing plate 94 at the end surface 15b of the edge 15 of the tubular section 12 opposite to the bottom section 13.

The pressing mechanism 85 applies a brake pressure to the bottom section 13 of the piston 11 when a brake liquid is introduced into the bore 100 of the cylinder 96 from the through-hole 105. Then, the piston 11 advances toward the disc 81 and presses the brake pad 83 at the inner side toward the disc 81 via the pressing plate 94. Here, as the edge 15 of the opening 14 of the piston 11 causes the end surface 15b to abut the pressing plate 94, the brake pad 83 is pressed at a portion of the end surface 15b. Accordingly, the brake pad 83 is moved to come in contact with the disc 81. That is, the brake pad 83 is pressed by the end surface 15b of the edge 15 of the opening 14 of the piston 11 to come in contact with the disc 81.

In addition, the caliper body 91 is moved by a repulsive force of the pressing, and the brake pad 84 of the outer side is pressed toward the disc 81 by the claw section 98. Accordingly, the brake pad 84 comes in contact with the disc 81.

As described above, the pressing mechanism 85 sandwiches the pair of brake pads 83 and 84 from both sides by an action of the piston 11 using the piston 11 and the claw section 98 to press against both surfaces of the disc 81. As a result, the pressing mechanism 85 applies a frictional resistance to the disc 81 to generate a braking force.

In the device and method for manufacturing the piston for a brake disclosed in Patent Literature 1, when an annular end portion of an opening side of the material is pressed from an outer circumferential side by a first roller to form a groove, the annular end portion of the material is pressed from the axial direction by a second roller at different positions in the circumferential direction to form a thick section extruded in the central axis direction from the inner circumferential surface of the annular end portion. For this reason, the end surface of the annular end portion of the piston differs in a radial dimension or an axial dimension depending on a position in the circumferential direction, a shape of the surface in contact with the pad differs, and a portion of the surface in contact with the pad may receive an influence of a variation in dimensions of the material to be widened or narrowed to cause a variation (individual differences). Since the portion of the end surface is a portion that presses the brake pad, when variation occurs, a surface pressure may be unstable and brake noise suppression performance may be unstable depending on the piston. In addition, even when an inner diameter or an outer diameter in contact with the pad differs, this causes brake noise.

On the other hand, in the piston manufacturing device 10 of the first embodiment, the recessed section 53 is formed at a portion of the edge forming roller 52 abutting the edge 15 of the opening 14 of the piston 11 such that an inner circumferential side of the edge 15 is plastically deformed toward the bottom section 13 in the piston axial direction. Then, in a thick section forming step of pressing the edge 15 of the opening 14 of the piston 11 toward the bottom section 13 in the piston axial direction and forming the thick section 65 extruded from the inner circumferential surface 12*b* between the edge 15 and the groove 61 toward a piston axial center, the inner circumferential side of the edge 15 is plastically deformed toward the bottom section 13 in the piston axial direction by the recessed section 53. Accordingly, even when there is a variation in the material, a variation in area of the end surface 15*b* of the edge 15 of the opening 14 of the piston 11 can be suppressed. As a result, in the disc brake 80 into which the piston 11 is incorporated, the surface pressure to the brake pad 83 of the piston 11 can be stabilized and brake noise performance can be stabilized. Moreover, like the case in which the end surface 15*b* is formed through cutting, a variation in area of the end surface 15*b* can be suppressed by plastic deformation. For this reason, the variation of a contact shape with the pad can be suppressed and manufacturing costs of the piston 11 can be suppressed.

In other words, in the piston 11 of the first embodiment, the portion in the piston central axis direction of the edge 15 of the opening 14 is the thick section 65 protruding in the central axis direction, and the thick section 65 is folded toward the bottom section 13 of the piston 11. For this reason, when a final shape of the edge 15 side of the opening 14 is formed by plastic deformation, variations in area, inner diameter and outer diameter of the end surface 15*b* of the edge 15 of the opening 14 of the piston 11 can be suppressed.

Further, in other words, the disc brake 80 of the first embodiment can suppress the variation in area of the end surface 15*b* of the edge 15 of the opening 14 of the piston 11. For this reason, the surface pressure to the brake pad 83 of the piston 11 can be stabilized and brake noise suppression performance can be stabilized.

In addition, in the piston manufacturing device 10 of the first embodiment, the spherical outer circumferential surface 52*f* of the recessed section 53 of the edge forming roller 52 has a predetermined curvature. For this reason, a difference in circumferential speed between the piston 11 and the spherical outer circumferential surface 52*f* can be decreased, and friction due to the difference in circumferential speed can be reduced. Accordingly, stress applied to the edge forming roller 52 and the piston 11 can be reduced. As a result, a lifetime of the edge forming roller 52 can be lengthened and a load to the piston manufacturing device 10 can be suppressed. In addition, a decrease in quality such as burning or the like of the piston 11 can be suppressed. In addition, since a contact area between the edge forming roller 52 and the piston 11 can be reduced and the surface pressure upon machining can be increased, formability can be improved.

In other words, the folded area of the piston 11 of the first embodiment has the curved surface 65*a*. For this reason, when the final shape of the edge 15 side of the opening 14 is formed by plastic deformation, the variation in area of the end surface 15*b* of the edge 15 of the opening 14 of the piston 11 can be suppressed. In addition, the folded area of the piston 11 of the first embodiment has the curved surface 65*a*. For this reason, when the edge 15 of the opening 14 of the piston 11 is formed by plastic deformation, stress applied to the piston 11 and the piston manufacturing device 10 can be reduced. In addition, a decrease in quality such as burning or the like of the piston 11 can be suppressed. In addition, formability can be improved.

In addition, in the piston manufacturing device 10 of the first embodiment, only the recessed section 53 is provided as a means configured to press the edge 15 of the opening 14 of the piston 11 from the inside of the piston 11. For this reason, the structure can be simplified and manufacturing cost can be reduced.

Second Embodiment

Figure 6:
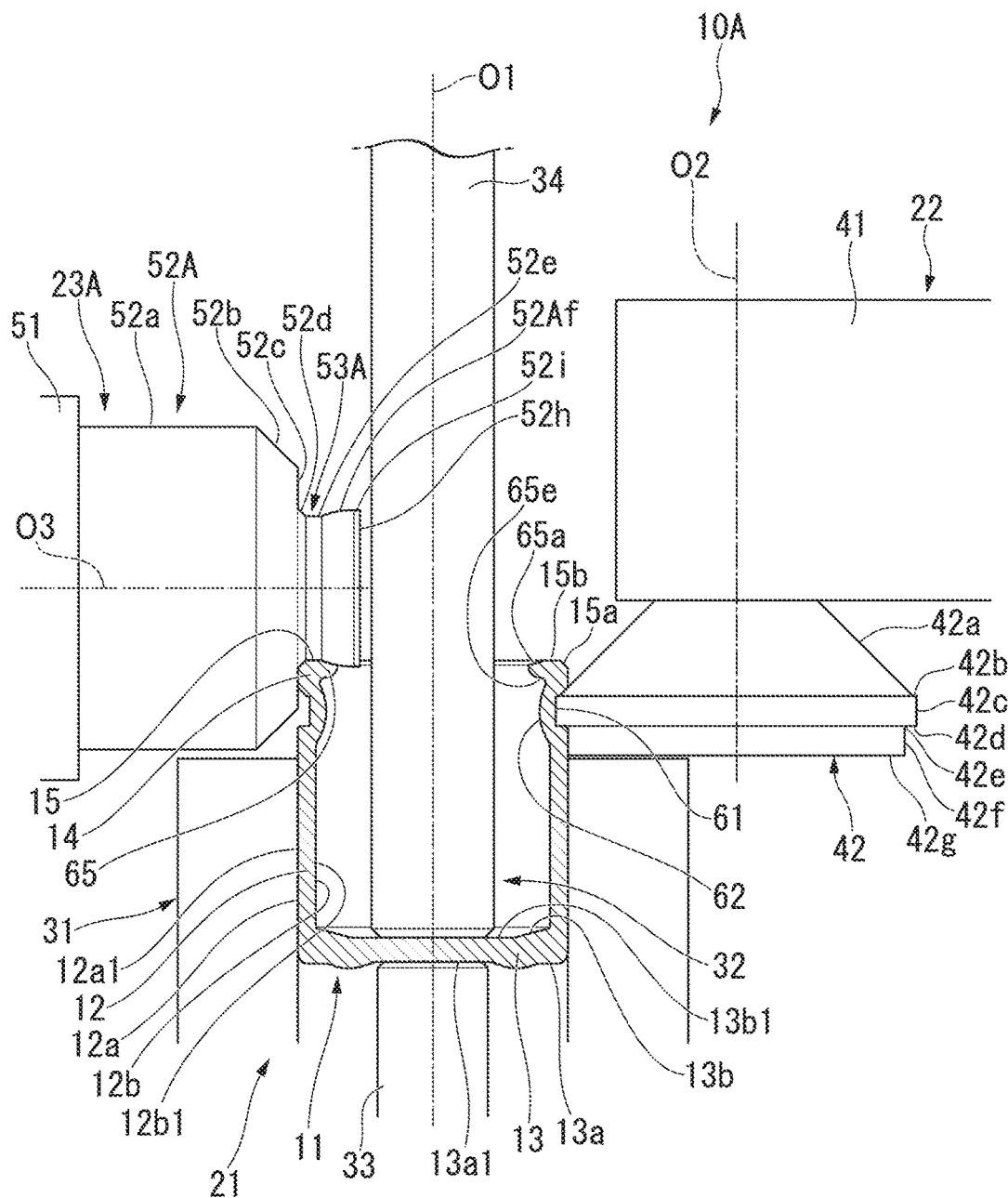
FIG. 6 is a front view showing a partial cross section of a piston manufacturing device and a piston of a second embodiment after machining thereof.

Next, a second embodiment will be described with reference to FIG. 6 mainly focusing on differences from the first embodiment. Further, parts the same as in the first embodiment are designated by the same names and the same reference numerals.

In the second embodiment, a piston manufacturing device 10A partially different from the piston manufacturing device 10 of the first embodiment is used. In the piston manufacturing device 10A, an edge forming device 23A partially different from the edge forming device 23 of the first embodiment is used. Specifically, an edge forming roller 52A partially different from the edge forming roller 52 of the first embodiment is used.

The edge forming roller 52A of the second embodiment has a spherical outer circumferential surface 52A*f* in which an angle with respect to the rotation central axis O3 is shallower than that of the spherical outer circumferential surface 52*f* of the first embodiment. That is, a ratio of a variation in diameter with respect to a variation in distance in a direction along the rotation central axis O3 of the spherical outer circumferential surface 52A*f* is smaller than that for the spherical outer circumferential surface 52*f* of the first embodiment.

A cylindrical outer circumferential surface 52*i* extending from the edge portion of the rotation central axis O1 side of the spherical outer circumferential surface 52A*f* toward the rotation central axis O1 is formed at the edge forming roller 52A of the second embodiment. The cylindrical outer circumferential surface 52*i* is a cylindrical surface formed about the rotation central axis O3. As the stepped surface 52*c*, the tapered outer circumferential surface 52*d*, the cylindrical outer circumferential surface 52*e* and the spherical outer circumferential surface 52A*f* are formed at the edge forming roller 52A, a recessed section 53A recessed inward in the radial direction is formed. The recessed section 53A also has an annular shape formed about the rotation central axis O3. The recessed section 53A is curved such that the spherical outer circumferential surface 52A*f* constituting a portion of the recessed section 53A has a predetermined curvature.

In the piston manufacturing device 10A, an angle of the spherical outer circumferential surface 52A*f* of the edge forming roller 52A with respect to the rotation central axis O3 is shallower than that of the spherical outer circumferential surface 52*f* of the first embodiment. For this reason, in the piston 11 machined by the piston manufacturing device 10A, an angle of the curved surface 65*a* of the thick section 65 with respect to the rotation central axis O3 is shallower than that in the first embodiment. That is, the piston 11 machined by the piston manufacturing device 10A has a ratio of a variation in distance in the piston axial direction with respect to a variation in distance in the piston radial direction of the curved surface 65*a* of the thick section 65, which is smaller than that in the first embodiment.

Here, contrary to the second embodiment, it is possible to make the angle of the spherical outer circumferential surface of the edge forming roller deeper than that of the first embodiment. That is, a ratio of a variation in diameter with respect to a variation in distance in a direction along the rotation central axis O3 of the spherical outer circumferential surface may be larger than that of the spherical outer circumferential surface 52*f* of the first embodiment.

Third Embodiment

Figure 7:
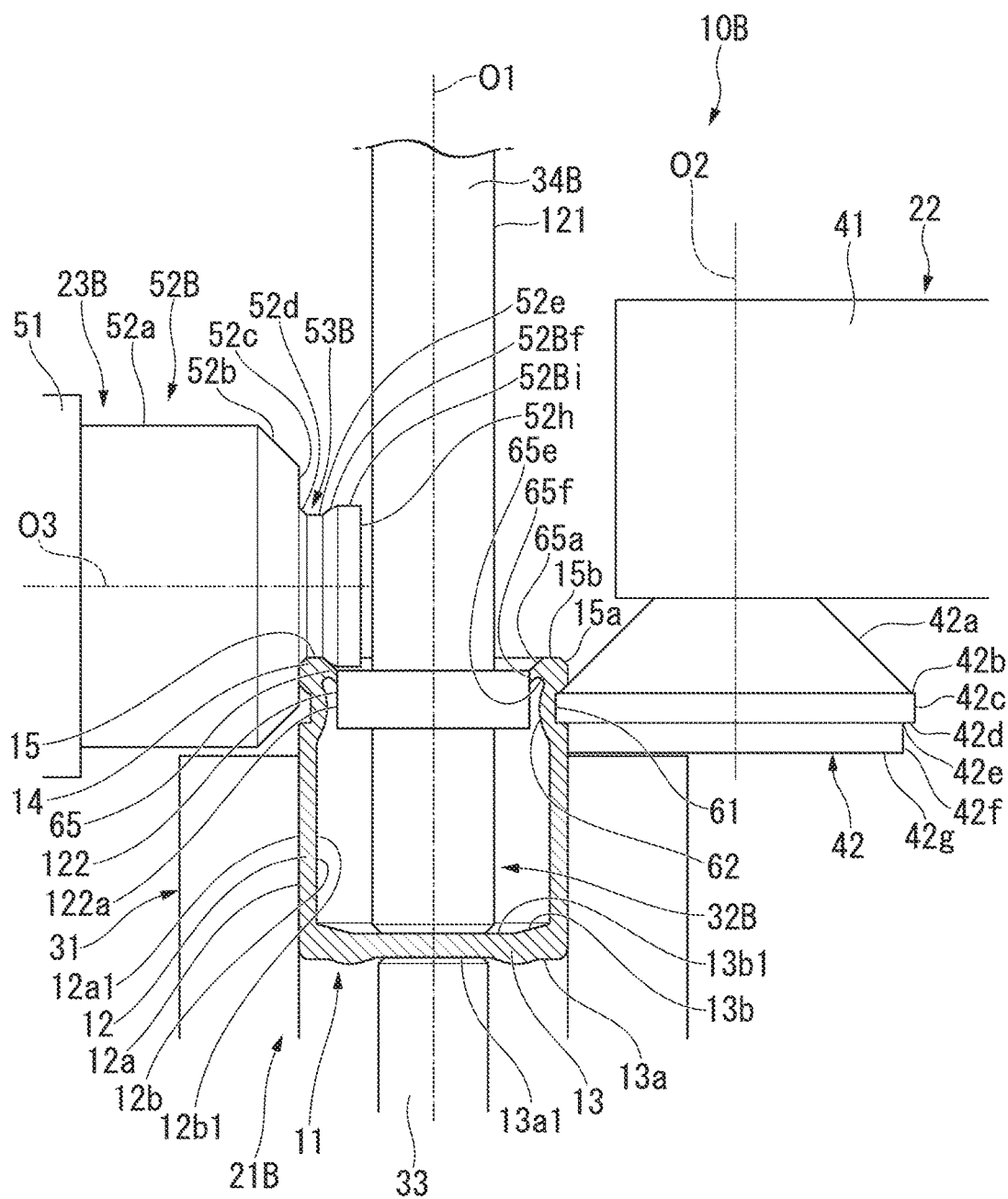
FIG. 7 is a front view showing a partial cross section of a piston manufacturing device and a piston of a third embodiment after machining thereof.

Next, a third embodiment will be described with reference to FIG. 7 mainly focusing on differences from the first embodiment. Further, parts the same as those in the first embodiment are designated by the same names and the same reference numerals.

A piston manufacturing device 10B partially different from the piston manufacturing device 10 of the first embodiment is used in the third embodiment. A rotating device 21B partially different from the rotating device 21 of the first embodiment is used in the piston manufacturing device 10B. A clamping part 32B partially different from the clamping part 32 of the first embodiment is used in the rotating device 21B. Specifically, an inner core bar 34B partially different from the inner core bar 34 of the first embodiment is used.

In addition, an edge forming device 23B partially different from the edge forming device 23 of the first embodiment is used in the piston manufacturing device 10B, and specifically, an edge forming roller 52B partially different from the edge forming roller 52 of the first embodiment is used.

The inner core bar 34B of the third embodiment has a major axis section 121 configured to sandwich the bottom section 13 of the piston 11 with the outer core bar 33 at the same outer diameter as the inner core bar 34 of the first embodiment, and a large diameter section 122 having an outer diameter larger than that of the major axis section 121. The large diameter section 122 is formed at a predetermined position in the middle of the major axis section 121 in the axial direction, and has a cylindrical outer circumferential surface 122*a* constituted by a cylindrical surface formed about the rotation central axis O1.

The edge forming roller 52B of the third embodiment is formed so that a spherical outer circumferential surface 52B*f* having a length in an extension direction of the rotation central axis O3 smaller than that of the spherical outer circumferential surface 52*f* of the first embodiment extends from the edge portion of the rotation central axis O1 side of the cylindrical outer circumferential surface 52*e* toward the rotation central axis O1. The spherical outer circumferential surface 52B*f* also has a diameter about the rotation central axis O3 that increases toward the rotation central axis O1. The spherical outer circumferential surface 52B*f* constituted by a surface of a sphere or a spheroid is, in other words, a curved surface having a predetermined curvature.

A cylindrical outer circumferential surface 52B*i* extending from the edge portion of the rotation central axis O1 side of the spherical outer circumferential surface 52B*f* toward the rotation central axis O1 is formed at the edge forming roller 52B of the third embodiment. The cylindrical outer circumferential surface 52B*i* is a cylindrical surface formed about the rotation central axis O3.

The end surface 52*h* extends from the edge portion of the rotation central axis O1 side of the cylindrical outer circumferential surface 52B*i* inward in the radial direction.

As the stepped surface 52*c*, the tapered outer circumferential surface 52*d*, the cylindrical outer circumferential surface 52*e* and the spherical outer circumferential surface 52B*f* are formed at the edge forming roller 52B, a recessed section 53B recessed inward in the radial direction is formed. The recessed section 53B also has an annular shape formed about the rotation central axis O3. The recessed section 53B is curved such that the spherical outer circumferential surface 52B*f* constituting a portion of the recessed section 53B has a predetermined curvature.

The piston manufacturing device 10B forms the thick section 65 using the edge forming roller 52B while forming the annular groove 61 by using the groove forming roller 42 with respect to the piston 11 rotated by the rotating device 21B, like the first embodiment. Here, the large diameter section 122 of the inner core bar 34B of the rotating device 21B abuts the thick section 65 of the piston 11, which is extruded by the edge forming roller 52B inward in the radial direction, at the rotation central axis O1 side, i.e., a piston axial center side in order to restrict plastic deformation beyond a predetermined amount toward the piston axial center side. In other words, the large diameter section 122 presses the thick section 65 from the piston axial center side (inside the piston 11) using a repulsive force when the thick section 65 is plastically deformed toward the rotation central axis O1, i.e., the piston axial center.

As a result, a cylindrical surface 65*f* extending from the inner circumferential edge portion of the curved surface 65*a* of the thick section 65 toward the bottom section 13 and constituted by a cylindrical surface formed about the rotation central axis O1, i.e., the central axis of the piston 11 is formed at the piston 11 after machining by the piston manufacturing device 10B of the third embodiment.

According to the piston manufacturing device 10B of the above-mentioned third embodiment, upon plastic deformation of the thick section 65, the large diameter section 122 presses the thick section 65 from the inside of the piston 11. For this reason, plastic deformation of the thick section 65 can be more stably performed. Accordingly, precision of the edge 15 having the tapered surface 15a, the end surface 15b and the curved surface 65a of the piston 11 can be improved.

Fourth Embodiment

Figure 8:
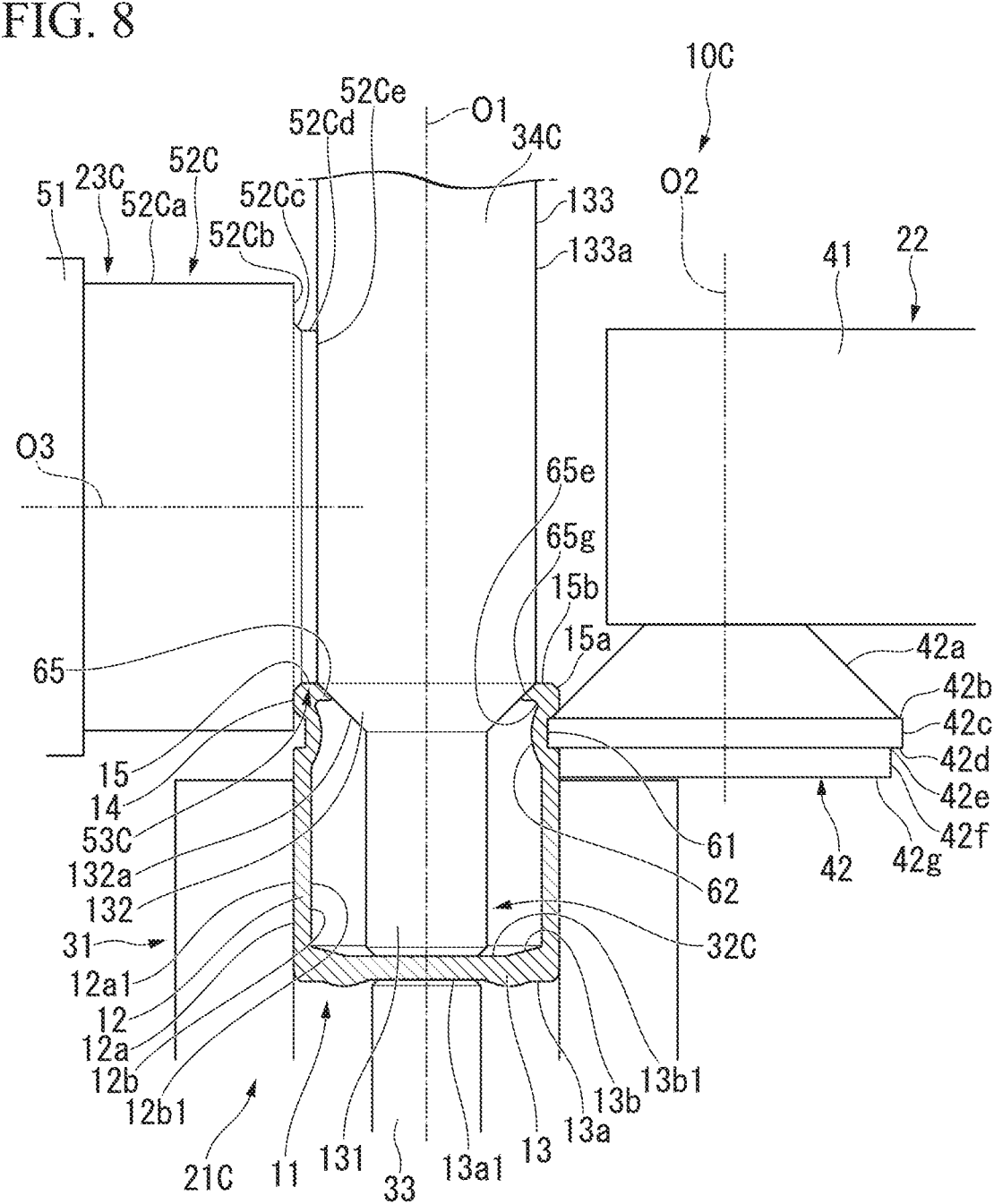
FIG. 8 is a front view showing a partial cross section of a piston manufacturing device and a piston of a fourth embodiment after machining thereof.

Next, a fourth embodiment will be described with reference to FIG. 8 mainly focusing on differences from the first embodiment. Further, parts the same as in the first embodiment are designated by the same names and the same reference numerals.

In the fourth embodiment, a piston manufacturing device 10C partially different from the piston manufacturing device 10 of the first embodiment is used. A rotating device 21C partially different from the rotating device 21 of the first embodiment is used in the piston manufacturing device 10C. A clamping part 32C partially different from the clamping part 32 of the first embodiment is used in the rotating device 21C. Specifically, an inner core bar 34C (a second forming device) partially different from the inner core bar 34 of the first embodiment is used. In addition, an edge forming device 23C partially different from the edge forming device 23 of the first embodiment is used in the piston manufacturing device 10C. Specifically, an edge forming roller 52C (a second forming device) partially different from the edge forming roller 52 of the first embodiment is used.

The inner core bar 34C of the fourth embodiment has a pressing section 131, a tapered section 132 and a large diameter section 133 in sequence from a side close to the outer core bar 33, i.e., from a lower side. The pressing section 131 sandwiches the bottom section 13 of the piston 11 with the outer core bar 33 at the same outer diameter as the inner core bar 34 of the first embodiment.

The tapered section 132 extends from the end portion of the pressing section 131 opposite to the outer core bar 33 while increasing in diameter in a direction opposite to the outer core bar 33. The tapered section 132 has a tapered surface 132a formed about the rotation central axis O1. The tapered surface 132a has a diameter that is increased toward an opposite side of the pressing section 131, i.e., from an upper side.

The large diameter section 133 extends from the edge portion of the tapered section 132 opposite to the pressing section 131 in a direction opposite to the pressing section 131. The large diameter section 133 has a cylindrical outer circumferential surface 133a constituted by a cylindrical surface formed about the rotation central axis O1, and the cylindrical outer circumferential surface 133a extends from the edge portion of the tapered surface 132a opposite to the pressing section 131 in a direction opposite to the pressing section 131.

The edge forming roller 52C of the fourth embodiment has a cylindrical outer circumferential surface 52Ca, a stepped surface 52Cb, a tapered outer circumferential surface 52Cc, a cylindrical outer circumferential surface 52Cd and an end surface 52Ce in sequence from the head 51 side in the extension direction of the rotation central axis O3.

The cylindrical outer circumferential surface 52Ca is a cylindrical surface formed about the rotation central axis O3.

The stepped surface 52Cb extends from the edge portion of the rotation central axis O1 side of the cylindrical outer circumferential surface 52Ca inward in the radial direction. The stepped surface 52Cb is a flat surface having an annular shape formed about the rotation central axis O3 and disposed at the same plane as the surface perpendicular to the rotation central axis O3.

The tapered outer circumferential surface 52Cc is a tapered surface extending from the inner circumferential edge portion of the stepped surface 52Cb toward the rotation central axis O1 and formed about the rotation central axis O3. The tapered outer circumferential surface 52Cc has a diameter that decreases toward the rotation central axis O1.

The cylindrical outer circumferential surface 52Cd is a cylindrical surface extending from the edge portion of the rotation central axis O1 side of the tapered outer circumferential surface 52Cc toward the rotation central axis O1 and formed about the rotation central axis O3. The cylindrical outer circumferential surface 52Cd has a diameter that is smaller than that of the stepped surface 52Cb.

The end surface 52Ce extends from the edge portion of the rotation central axis O1 side of the cylindrical outer circumferential surface 52Cd inward in the radial direction. The end surface 52Ce is a flat surface having a circular shape about the rotation central axis O3 and perpendicular to the rotation central axis O3.

When the edge forming roller 52C moves toward the gripping part 31 along the rotation central axis O1 while causing the end surface 52Ce to approach the cylindrical outer circumferential surface 133a of the inner core bar 34C, the lower end position of the cylindrical outer circumferential surface 52Cd matches a boundary position between the cylindrical outer circumferential surface 133a and the tapered surface 132a of the inner core bar 34C. Accordingly, a recessed section 53C recessed inward in the radial direction is formed by the stepped surface 52Cb, the tapered outer circumferential surface 52Cc and the cylindrical outer circumferential surface 52Cd of the edge forming roller 52C, and the tapered surface 132a of the inner core bar 34C.

In the piston manufacturing device 10C of the fourth embodiment, like the first embodiment, the groove forming roller 42 forms the annular groove 61 in the piston 11 rotated by the rotating device 21C. Here, the tapered outer circumferential surface 52Cc and the cylindrical outer circumferential surface 52Cd of the edge forming roller 52C abut the edge 15 of the opening 14 of one end side in the axial direction of the piston 11, and the edge 15 is pressed toward the other end side in the axial direction opposite to the edge 15 of the piston 11. As a result, the edge forming roller 52C plastically deforms the opening 14 such that a position of the edge 15 approaches the bottom section 13 in the piston axial direction.

Here, deformation to a side of the opening 14 opposite to the rotation central axis O1 is restricted by the stepped surface 52Cb of the edge forming roller 52C. Accordingly, a portion of mainly the inner circumferential side of the edge 15 of the opening 14 of the tubular section 12 extends inward in the radial direction, and the opening 14 of the tubular section 12 is plastically deformed toward the other end side in the axial direction (the bottom section 13 side in the piston axial direction) to follow the tapered surface 132a of the inner core bar 34C. Then, the portion is extruded from the inner circumferential surface 12b, which is between the edge 15 and the groove 61, toward the rotation central axis O1 closer to an axial center of the piston 11 than the inner circumferential cylindrical surface 12b1, and becomes the thick section 65 protruding toward the rotation central axis O1.

That is, as the edge 15 of the opening 14 of the piston 11 is pressed toward the other end side in the axial direction of the piston 11 by the recessed section 53C constituted by the stepped surface 52C*b*, the tapered outer circumferential surface 52C*c* and the cylindrical outer circumferential surface 52C*d* of the edge forming roller 52C and the tapered surface 132*a* of the inner core bar 34C, a thick section forming step of the piston manufacturing method for forming the thick section 65 extruded from the inner circumferential surface 12*b* between the edge 15 and the groove 61 toward the axial center of the piston 11. The thick section forming step includes plastically deforming the inner circumferential side of the edge 15 toward the other end side in the axial direction of the piston 11. The recessed section 53C is formed at portions of the edge forming roller 52C and the inner core bar 34C abutting the edge 15 of the piston 11 such that the inner circumferential side of the edge 15 is plastically deformed toward the other end side in the axial direction of the piston 11.

As a result, a tapered surface 65*g* having a straight cross section instead of the curved surface 65*a* is formed in the piston 11 after machining by the piston manufacturing device 10C of the fourth embodiment at the inside in the piston radial direction of the end surface 15*b* and the bottom section 13 side in the piston axial direction. The tapered surface 65*g* is a portion formed at the tapered surface 132*a* of the inner core bar 34 and having a shape to which the tapered surface 132*a* is transferred. The tapered surface 65*g* is constituted by a tapered surface formed about the rotation central axis O1, i.e., the central axis of the piston 11. The tapered surface 65*g* extends from the edge portion of the rotation central axis O1 side of the end surface 15*b*, i.e., the piston axial center side in the piston central axis direction, and is inclined to be disposed closer to the bottom section 13 as it goes toward the piston axial center. Accordingly, the thick section 65 has a shape folded toward the bottom section 13. The folded area has a tapered surface shape.

According to the piston manufacturing device 10C of the above-mentioned fourth embodiment, the recessed section 53C is formed of two parts of the edge forming roller 52C and the inner core bar 34C. For this reason, it is possible to cope with repair of an edge forming roller and modification of an inner core bar of existing equipment that can form the end surface 15*b*. Accordingly, when the existing equipment is modified, costs incurred for modification can be reduced.

Fifth Embodiment

Figure 9:
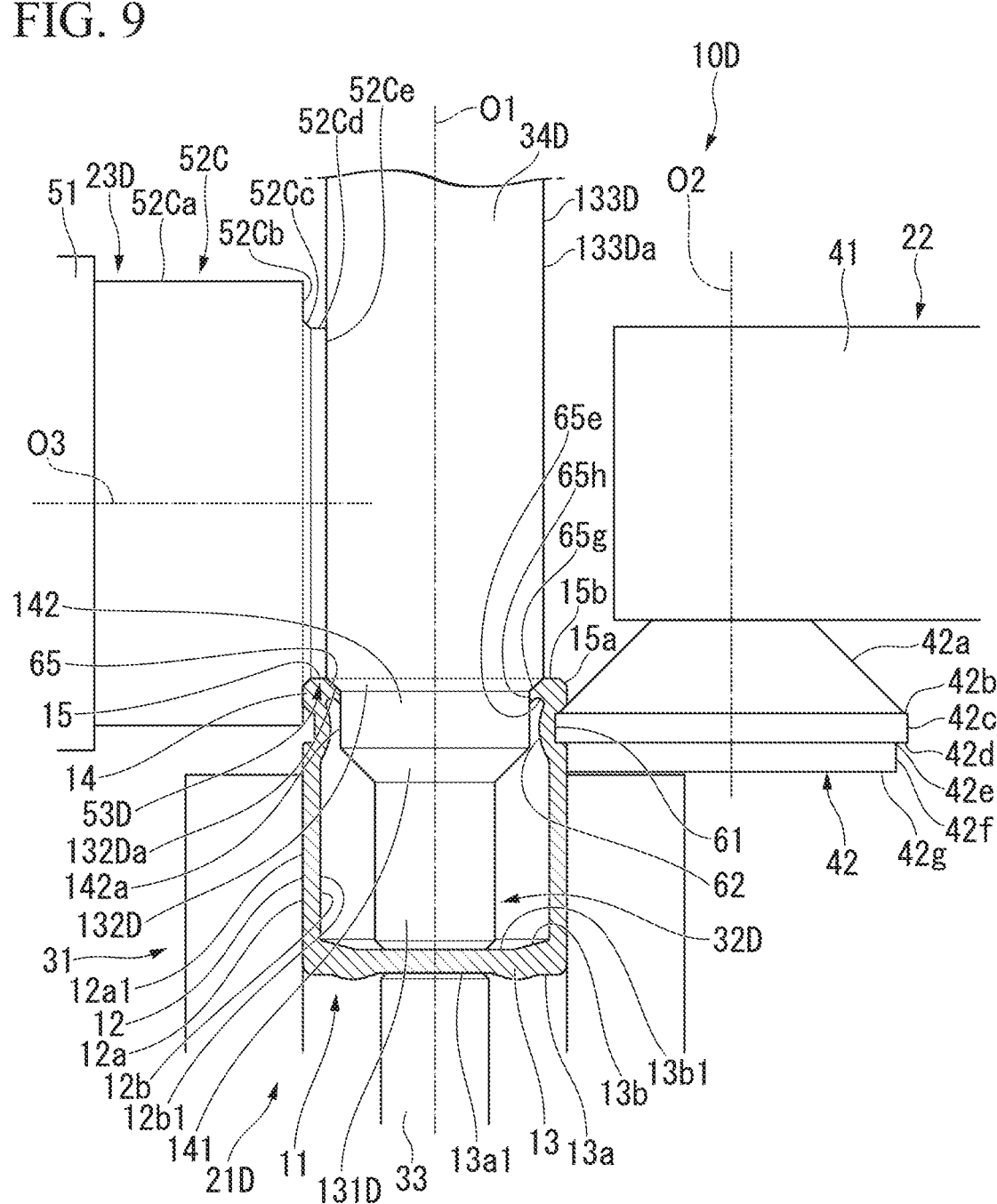
FIG. 9 is a front view showing a partial cross section of a piston manufacturing device and a piston of a fifth embodiment after machining thereof.

Next, a fifth embodiment will be described with reference to FIG. 9 mainly focusing on differences from the fourth embodiment. Further, parts the same as in the fourth embodiment are designated by the same names and the same reference numerals.

In the fifth embodiment, a piston manufacturing device 10D partially different from the piston manufacturing device 10C of the fourth embodiment is used. A rotating device 21D partially different from the rotating device 21C of the third embodiment is used in the piston manufacturing device 10D. A clamping part 32D partially different from the clamping part 32C of the fourth embodiment are used, and specifically an inner core bar 34D (a second forming device) partially different from the inner core bar 34C of the fourth embodiment are used in the rotating device 21D.

The inner core bar 34D of the fifth embodiment has a pressing section 131D, a tapered section 141, an intermediate diameter section 142, a tapered section 132D and a large diameter section 133D in sequence from a side close to the outer core bar 33, i.e., from the lower side. The pressing section 131D sandwiches the bottom section 13 of the piston 11 with the outer core bar 33 at the same outer diameter as the pressing section 131 of the fourth embodiment. The tapered section 141 extends from the end portion of the pressing section 131D opposite to the outer core bar 33 while increasing a diameter in a direction opposite to the outer core bar 33. The intermediate diameter section 142 extends from the edge portion of the tapered section 141 opposite to the pressing section 131D in a direction opposite to the pressing section 131D. The intermediate diameter section 142 has a cylindrical outer circumferential surface 142*a* constituted by a cylindrical surface formed about the rotation central axis O1.

The tapered section 132D extends from the end portion of the intermediate diameter section 142 opposite to the tapered section 141 while increasing a diameter in a direction opposite to the tapered section 141. The tapered section 132D has a tapered surface 132D*a* formed about the rotation central axis O1. The tapered surface 132D*a* extends from the edge portion of the cylindrical outer circumferential surface 142*a* opposite to the tapered section 141 in a direction opposite to the tapered section 141 and has a diameter that increases toward a side opposite to the tapered section 141, i.e., toward the upper side.

The large diameter section 133D extends from the end portion of the tapered section 132D opposite to the intermediate diameter section 142 in a direction opposite to the intermediate diameter section 142. The large diameter section 133D has a cylindrical outer circumferential surface 133D*a* constituted by a cylindrical surface formed about the rotation central axis O1. The cylindrical outer circumferential surface 133D*a* extends from the edge portion of the tapered surface 132D*a* opposite to the intermediate diameter section 142 in a direction opposite to the intermediate diameter section 142.

When the edge forming roller 52C moves toward the gripping part 31 along the rotation central axis O1 while the end surface 52C*e* approaches the cylindrical outer circumferential surface 133D*a* of the inner core bar 34D, the lower end position of the cylindrical outer circumferential surface 52C*d* matches a boundary position between the cylindrical outer circumferential surface 133D*a* and the tapered surface 132D*a* of the inner core bar 34D. Accordingly, the recessed section 53D recessed inward in the radial direction is formed by the stepped surface 52C*b*, the tapered outer circumferential surface 52C*c* and the cylindrical outer circumferential surface 52C*d* of the edge forming roller 52C and the tapered surface 132D*a* of the inner core bar 34D. Since the inner core bar 34D is different from the fourth embodiment, the edge forming device 23D constituted by the inner core bar 34D and the edge forming roller 52C is partially different from the fourth embodiment.

In the piston manufacturing device 10D, like the fourth embodiment, the edge forming roller 52C and the inner core bar 34D form the thick section 65 in the piston 11 rotated by the rotating device 21D while the groove forming roller 42 forms the annular groove 61. Here, the intermediate diameter section 142 of the inner core bar 34D abuts the thick section 65 of the piston 11, which is extruded inward in the radial direction by the edge forming roller 52C, at the rotation central axis O1 side, i.e., the piston axial center side in order to restrict plastic deformation beyond a predetermined amount to the piston axial center side. In other words, the intermediate diameter section 142 presses the thick section 65 from the piston axial center side (the inside of the piston 11) using a repulsive force when the thick section 65 is plastically deformed toward the rotation central axis O1, i.e., the piston axial center.

As a result, in the piston 11 after machining by the piston manufacturing device 10D of the fifth embodiment, a cylindrical surface 65h extending from the inner circumferential edge portion of the tapered surface 65g of the thick section 65 toward the bottom section 13 in the piston axial direction and constituted by the cylindrical surface formed about the rotation central axis O1, i.e., the central axis of the piston 11 is formed.

According to the piston manufacturing device 10D of the above-mentioned fifth embodiment, upon plastic deformation of the thick section 65, the intermediate diameter section 142 presses the thick section 65 from the inside of the piston 11. For this reason, plastic deformation of the thick section 65 can be more stably performed. Accordingly, precision of the edge 15 having the tapered surface 15a, the end surface 15b and the tapered surface 65g of the piston 11 can be improved.

In the above-mentioned first to fifth embodiments, the case in which the piston 11 is rotated in the piston circumferential direction upon machining has been described. However, the groove forming device 22 and the edge forming devices 23, 23A to 23D may be rotated while the piston 11 is not rotated. That is, the piston 11 may be relatively rotated with respect to the groove forming device 22 and the edge forming devices 23, 23A to 23D. Further, in the above-mentioned embodiment, the case in which the equipment is a vertical type has been described. However, the equipment may be a horizontal type, i.e., a rotation axis of the rotating device 21D may be provided in a horizontal direction.

The piston manufacturing device of the above-mentioned embodiment includes a rotating device configured to relatively rotate a tubular piston in a circumferential direction, a first forming device configured to press a portion of the piston from an outer circumferential side of the piston to form an annular groove, the portion of the piston being separated from an edge of an opening provided at one end side in an axial direction of the piston, and a second forming device configured to press the edge of the opening of the piston toward other end side in the axial direction of the piston and to form a thick section extruded from an inner circumferential surface of the piston toward an axial center of the piston, the inner circumferential surface being formed between the edge and the groove. A recessed section is formed at a portion of the second forming device that is arranged to abut the edge so that an inner circumferential side of the edge is plastically deformed toward the other end side in the axial direction of the piston. Accordingly, since the recessed section plastically deforms the inner circumferential side of the edge toward the other side in the piston axial direction, a variation in area of an end surface of the edge of the opening of the piston can be suppressed.

As the recessed section has a predetermined curvature, a difference in circumferential speed between the piston and the second forming device can be reduced, and friction due to the difference in circumferential speed can be reduced. Accordingly, stress applied to the piston and the second forming device can be reduced. As a result, the lifetime of the second forming device can be lengthened and a load to the piston manufacturing device can be suppressed. In addition, a decrease in quality such as burning or the like of the piston can be suppressed. In addition, since a contact area between the second forming device and the piston can be reduced and the surface pressure upon machining can be increased, formability can be improved.

As a configuration in which a means configured to press the edge from the inside of the piston is not provided except the recessed section, the structure can be simplified and equipment costs can be reduced.

The piston manufacturing method of the embodiment includes a rotation step of relatively rotating a tubular piston in a circumferential direction, a groove forming step of pressing a portion of the piston from an outer circumferential side of the piston and forming an annular groove, the portion of the piston being separated from an edge of an opening provided at one end side in an axial direction of the piston, and a thick section forming step of pressing the edge of the opening of the piston toward other end side in the axial direction of the piston and forming a thick section extruded from an inner circumferential surface of the piston toward an axial center side of the piston, the inner circumferential surface being formed between the edge and the groove. The thick section forming step includes plastically deforming the inner circumferential side of the edge toward the other end side in the axial direction of the piston. Accordingly, in the thick section forming step that presses the edge of the opening of the piston toward the other end side in the piston axial direction and that forms the thick section extruded from the inner circumferential surface between the edge and the groove to the piston axial center side, the inner circumferential side of the edge is plastically deformed toward the bottom section in the piston axial direction. For this reason, a variation in area of the end surface of the edge of the opening of the piston can be suppressed.

The piston of the embodiment is formed as a hollow cylinder and includes a bottom section to which a brake pressure is applied, and an edge of an opening of one end side in an axial direction in the hollow cylinder. The portion of the edge in the central axis direction of the piston is a thick section protruding in the central axis direction, the thick section is folded toward the bottom section, and the folded area is a curved surface shape. In this way, since the portion of the edge in the central axis direction of the piston is the thick section protruding in the central axis direction and the thick section is folded toward the bottom section of the piston, when the edge of the opening of the piston is formed by plastic deformation, a variation in area of the end surface of the edge of the opening of the piston can be suppressed. In addition, since the folded area is a curved surface, when the edge of the opening of the piston is formed by plastic deformation, stress applied to the piston and the device can be reduced. In addition, a decrease in quality such as burning or the like of the piston can be suppressed. In addition, formability can be improved.

The disc brake of the embodiment includes the above-mentioned piston, a cylinder in which the piston is movably disposed, and a brake pad arranged to be pressed by the edge of the opening of the piston and come in contact with a disc. Accordingly, since a variation in area of the end surface of the edge of the opening of the piston can be suppressed, a surface pressure to the brake pad of the piston can be stabilized and brake noise performance can be stabilized.

INDUSTRIAL APPLICABILITY

According to the above-mentioned piston manufacturing device, it is possible to provide a piston manufacturing device, a piston manufacturing method, a piston and a disc brake that are capable of suppressing a variation of a shape of a surface of the end surface of the piston on contact with the pad.

REFERENCE SIGNS LIST

11 Piston
12a Outer circumferential surface

12b Inner circumferential surface
13 Bottom section
14 Opening
15 Edge
21, 21B, 21C, 21D Rotating device
34C, 34D Inner core bar (second forming device)
42 Groove forming roller (first forming device)
52, 52A, 52B, 52C Edge forming roller (second forming device)
53, 53A, 53B, 53C, 53D Recessed section
61 Groove
65 Thick section
65a Curved surface
80 Disc brake
81 Disc
83 Brake pad
96 Cylinder

The invention claimed is:

1. A piston manufacturing device comprising:
a rotating device configured to relatively rotate a tubular piston in a circumferential direction;
a first forming device configured to press a portion of the piston from an outer circumferential side of the piston to form an annular groove, the portion of the piston being separated from an edge of an opening provided at one end side in an axial direction of the piston; and
a second forming device configured to press the edge of the opening of the piston toward other end side in the axial direction of the piston and to form a thick section extruded from an inner circumferential surface of the piston toward an axial center side of the piston, the inner circumferential surface being formed between the edge and the groove,
wherein a recessed section is formed at a portion of the second forming device that is arranged to abut the edge so that an inner circumferential side of the edge is plastically deformed toward the other end side in the axial direction of the piston.

2. The piston manufacturing device according to claim 1, wherein the recessed section has a predetermined curvature.

3. The piston manufacturing device according to claim 1, wherein a means configured to press the edge from the inside of the piston is not provided except the recessed section.

4. A piston manufacturing method comprising:
relatively rotating a tubular piston in a circumferential direction;
pressing a portion of the piston from an outer circumferential side of the piston and forming an annular groove, the portion of the piston being separated from an edge of an opening provided at one end side in an axial direction of the piston; and
pressing the edge of the opening of the piston toward the other end side in the axial direction of the piston and forming a thick section extruded from an inner circumferential surface of the piston toward an axial center side of the piston, the inner circumferential surface being formed between the edge and the groove,
wherein forming the thick section comprises plastically deforming an inner circumferential side of the edge toward the other end side in the axial direction of the piston.

5. A piston formed in a bottomed cylindrical shape, and comprising a bottom section to which a brake pressure is applied, and an edge of an opening provided at one end side in an axial direction in the bottomed cylindrical shape,
wherein a portion of the edge in a central axis direction of the piston is a thick section protruding toward the central axis of the piston, and
the thick section is folded toward the bottom section, and a cross section of the folded area is inclined to be disposed closer to the bottom section as it goes toward the central axis of the piston.

6. A disc brake comprising:
the piston according to claim 5;
a cylinder in which the piston is movably disposed; and
a brake pad arranged to be pressed by the edge of the opening of the piston and come in contact with a disc.

* * * * *